Aug. 29, 1967 L. E. HALL, SR 3,338,484
LOAD SUPPORT MEANS
Filed Jan. 28, 1966
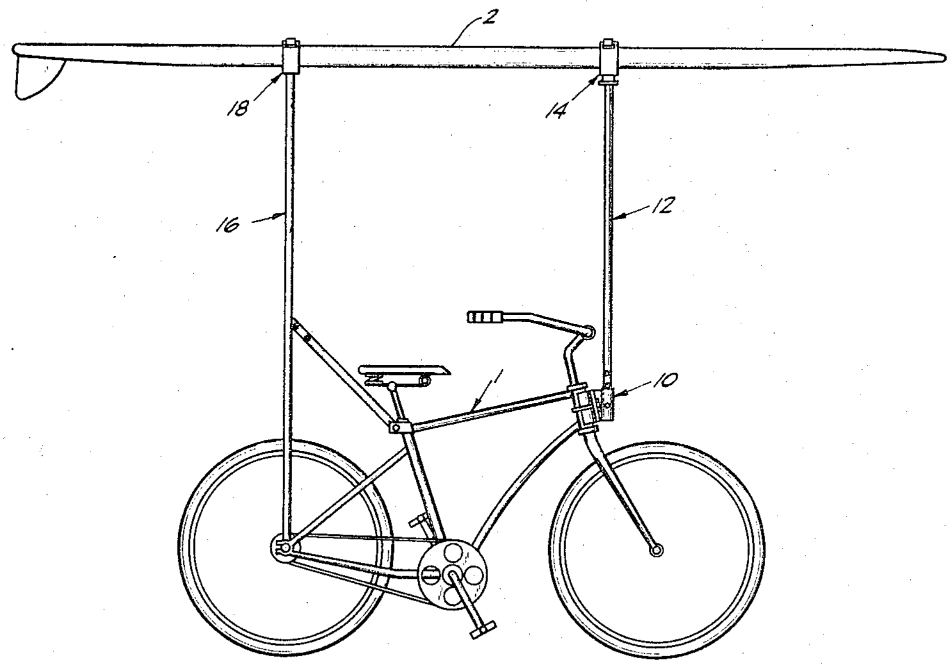
FIG-1
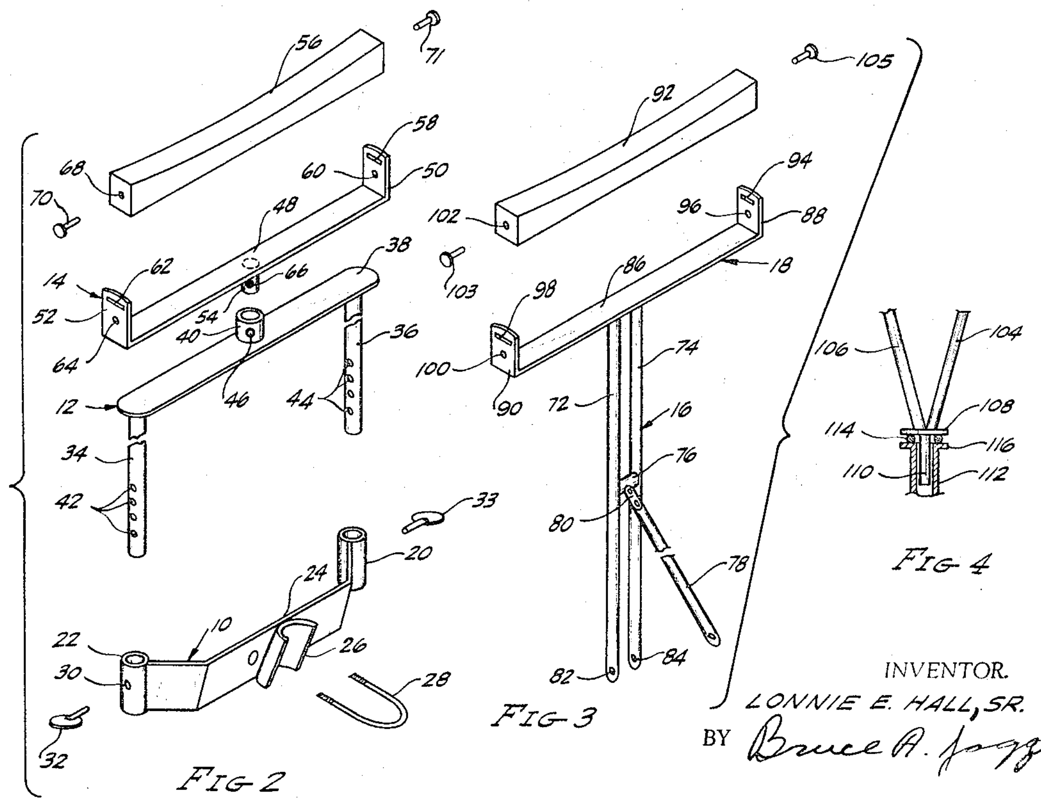
INVENTOR.
LONNIE E. HALL, SR.
BY Bruce A. Jagger
ATTORNEY United States Patent Office 3,338,484 Patented Aug. 29, 1967

3,338,484

LOAD SUPPORT MEANS

Lonnie E. Hall, Sr., 10601 Geraldine Road, Garden Grove, Calif. 92640

Filed Jan. 28, 1966, Ser. No. 526,679
5 Claims. (Cl. 224—41)

This invention relates to a load support means, more particularly, this invention relates to a means for supporting a load above a two-wheeled vehicle.

Considerable difficulty had previously been experienced in transporting bulky or elongated loads on two-wheeled vehicles such as bicycles or motorcycles. When elongated loads such as skis, surfboards, golf clubs and the like had previously been carried on two-wheeled vehicles they generally caused inconvenience and discomfort to the rider or riders of the vehicle as well as rendering the vehicle awkward or dangerously unsafe to maneuver.

These and other disadvantages of previous arrangements have been overcome according to the present invention by the provision of a load carrying means which is adapted to position bulky or elongated loads at a safe convenient location on a two-wheeled vehicle.

Broadly, the load supporting means of this invention is an overhead carrier for a two-wheeled vehicle which comprises a front mount, means for attaching such front mount to a front portion of the vehicle, a front load support member supported by the front mount, a rear mount, means for attaching the rear mount to a rear portion of the vehicle, and a rear load support member supported by the rear mount. The front and rear support members are adapted to cooperate with one another to support the load in substantially vertical alignment with the two-wheeled vehicle above the head of a rider mounted on the vehicle when the vehicle is in its normally upright position.

In general, both the front and rear mounts are adapted to extend generally vertical from the vehicle with the front mount extending from the vehicle at a point about where the handle bars or other steering mechanism for the front wheel of the vehicle is located. The rear mount is generally adapted to extend vertically from about the vicinity of the rear axle of the vehicle.

In general, both the front and rear mounts are provided with two legs which are adapted to straddle the plane defined by the vertical and longitudinal axis of the two-wheeled vehicle. In general, the front mount is adapted to be attached to a front portion of the vehicle, that is, a point on the vehicle which is generally forward of the position occupied by the rider. The front mount is also in general attached to a front portion of the vehicle which is forward of its center of gravity.

The rear mount is generally adapted to be attached to a rear portion of the vehicle, that is the portion of the vehicle which is normally behind the rider.

In general, the rear mount is attached to some portion of the vehicle which is rearward of the vehicle's center of gravity.

At least one of the front or rear mounts is provided with some height adjustment means so that the height of the load above the two-wheeled vehicle may be adjusted to a desired value.

For a more detailed understanding of the invention, reference is made to the accompanying drawings in which:

FIG. 1 is illustrative of the load supporting means of this invention attached to a two-wheeled vehicle;

FIG. 2 is a perspective, exploded view illustrative of the front portion of the load supporting means of this invention;

FIG. 3 is a perspective exploded view which is illustrative of the rear portion of the load supporting means of this invention;

FIG. 4 is illustrative of a further embodiment of the mount of this invention.

Referring particularly to FIG. 1, there is illustrated a bicycle indicated generally at 1, to which is attached at a front portion thereof, a mounting bar 10, which carries a front mount 12, and load support member 14. To a rear portion of bicycle 1, is attached rear mount 16, which supports rear load support member 18. A surfboard 2, is the load supported by front and rear load support members, 14 and 18, respectively. Mounting bar 10 is adapted to carry front mount 12 in a normally vertical position. The load supporting means of this invention is so arranged that the load is supported substantially vertically above the two-wheeled vehicle in its normally upright position. The load supporting means is generally arranged so that the load is supported symmetrically about the plane defined by the longitudinal and vertical axes of the two-wheeled vehicle.

As illustrated in FIG. 2, mounting bar 10 is composed of a first leg receptacle 20 and a second leg receptacle 22. First leg receptacle 20 and second leg receptacle 22 are attached to receptacle support member 24. Clamping bracket 26 is attached to receptacle support member 24, about midway between first leg receptacle 20 and second leg receptacle 22. U-bolt 28 cooperates with clamping bracket 26 to secure mounting bar 10 to a front portion of a two-wheeled vehicle. Second leg receptacle 22 contains a hole 30 which is adapted to receive a wing nut bolt 32. First leg receptacle 20 contains a similar hole, not shown, which adapted to receive wing nut bolt 33. Front mount 12 contains a first leg 34, a second leg 36, a front cross member 38 and socket 40. First leg 34 contains a plurality of adjustment holes 42. First leg 34 is attached, at the opposite end from adjustment holes 42, to front cross member 38. First leg 34 is positioned at one end of front cross member 38. Second leg 36 is attached, at the opposite end from adjustment holes 44 to front cross member 38. Second leg 36 is attached to front cross member 38 on the same side but at the opposite end of the cross member from first leg 34. Socket 40 is attached to the opposite side of front cross member 38 from first leg 34 and second leg 36. Socket 40 is attached to the front cross member 38 at a point intermediate the attachment points for first leg 34 and second leg 36. Socket 40 contains a hole 46 which passes transversely through the socket. Front load support member 14 contains front cross bar 48 first ear 50, second ear 52, stub 54 and front contoured support 56. First ear 50 and second ear 52 are attached at opposite ends of front cross bar 48 and extend generally parallel to one another. Stub 54 is attached to front cross bar 48 intermediate first ear 50 and second ear 52 and extends in a direction generally opposite to that of the first and second ears. Front contoured support 56 fits into the receptacle formed by the cooperation of front cross bar 48 with first ear 50 and second ear 52. First ear 50 is provided with a strap slot 58 and a hole 60. Second ear 52 is provided with a strap slot 62 and a hole 64. Stub 54 is provided with a hole 66 drilled transversely through the stub. Front contoured support 56 contains a recess 68 which is adapted to cooperate with pin 70 and a recess, not shown, which is adopted to cooperate with pin 71. As illustrated in FIG. 3, rear mount 16 contains a first leg 72, a second leg 74, a transverse brace 76, and a brace 78. Transverse brace 76 extends between first leg 72 and second leg 74 intermediate the ends thereof. First leg 72 and second leg 74 extend generally parallel with one another. Transverse brace 76 is provided with a brace attachment 80 which is adapted to be connected to brace 78. First leg 72 is provided adjacent one end thereof with a first leg attachment fitting 82. Second leg 74 is provided adjacent one end thereof with a second leg attachment fitting 84. A ear load support member 18 contains rear cross bar 86, rst ear 88, second ear 90 and rear contoured support 2. A rear cross bar 86 is attached at two points intermeiate its ends to the ends of first leg 72 and second leg 4. The attachments between first and second legs 72 nd 74 and rear cross bar 86 are at those ends of the egs which are remote from first leg attachment fitting 2 and second leg attachment fitting 84. First ear 88 is rovided with a strap slot 94 and a hole 96. Second ear 0 is likewise provided with a strap slot 98 and hole 100. rear contoured support 92 is provided with a recess 102. ins 103 and 105 secure contoured support 92 to ears 8 and 90.

Referring particularly to FIG. 4, there is illustrated n embodiment of this invention wherein one of the nounts, generally the front mount, is arranged so that he legs form a V. The legs of the front mount converge rom the cross-member. Legs 104 and 106 meet at a connon point and are attached at that point to a circular late 108. A stub 110 is attached to plate 108 at the opposite side, thereof, from which legs 104 and 106 are ttached. Stub 110 is so mounted that its longitudinal axis isects the angle between legs 104 and 106. A socket nember 112 receives stub 110 and a ball bearing race 14 is provided between plate 108 and a flange 116. Ball earing race 114 permits relative movement between the nount and socket member 112. In operation, the overead carrier of this invention is utilized by clamping nounting bar 10, by means of clamping brackets 26 and U-bolt 28, to a front portion of a two-wheeled vehicle. First leg 34 and second leg 36, respectively, of front mount 12, are inserted into second leg receptacle 22, and first leg receptacle 20, respectively. Front mount 12 extends generally vertically from the two-wheeled vehicle when it is in its normally upright position.

The height of front cross member 48 above the vehicle is adjusted by bringing the desired adjustment holes 42 into a register with hole 30. A wing nut bolt 32 is inserted through the hole 30 and one of adjustment holes 42. A second wing nut bolt 33 is inserted through a hole, not shown, in first leg receptacle and registers with one of adjustment holes 44.

Front load support member 14 is attached to front mount 12 by inserting stub 54 into socket 40 and securing them together by passing a pin through holes 46 and 66.

Front contoured support 56 is secured in the receptacle formed by the coaction of front cross bar 48, with first ear 50 and second ear 52 by pin 70 which pin is passed through hole 64 and secured within recess 68, and a similar pin 71 which passes through hole 60 and into a recess, not shown in contoured support 56. Strap slots 58 and 62 are provided so that a web or strap may be passed around the load supported on the upper surface of the front contoured support 56 to hold the load on support 56. A rear mount 16 is attached to a rear portion of a two-wheeled vehicle and extends generally vertically from that vehicle when it is in the normally upright position. In general, first and second legs 72 and 74 are mounted so that they straddle a two-wheeled vehicle. First and second leg attachment fittings 82 and 84 are attached to either side of the vehicle at some convenient attachment point. A convenient attachment point for most bicycles is the rear axle.

Transverse brace 76 lends rigidity to legs 72 and 74. In order to prevent rear mount 16 from pivoting about first and second leg attachment fittings 82 and 84, brace attachment 80 is attached to brace 78 which is in turn attached to some point on the two-wheeled vehicle. In a bicycle a convenient attachment point for brace 78 is found in the vicinity of the seat. A rear load support member 18 is supported by rear mount 16. Preferably a rear load support member 18 is so positioned that the load is supported equally by each of first leg 72 and second leg 74. Rear contoured support 92 is secured to first and second ears 88 and 90 by means of pins passed through holes 96 and 100 into recesses such as 102 in the rear contoured support 92. The load to be carried on the top surface of rear contoured support 92 is secured in place by a strap or web of material which is fastened to first ear 88 by strap slot 94 and a second ear 90 by strap slot 98. The front and rear load support member 14 and 18, and their respective front and rear mounts 12 and 16 cooperate to support a load, and particularly an elongated load, above the head of a rider on a two-wheeled vehicle. Such elongted loads include, for examples, skis, surfboards, and the like. The height adjustment options provided by adjustment holes 42 and 44 in first leg 34 and second leg 36 respectively, in cooperation with first leg receptacle 20 and second leg receptacle 22, serve two functions. The height of the load carried on the front load support member 14 may be adjusted to provide sufficient clearance for the rider of the vehicle. When the load carried by the overhead carrier of this invention has a relatively large surface area such as that presented by a surfboard it may be desirable to lower the front of the load so that the relative wind will not cause lift to be developed by the load. When the two-wheeled vehicle is a motor cycle capable of speeds in excess of 50 miles per hour, it is essential that a surfboard be carried with the front end lower than the back. If the front end of a surfboard is higher than its back end the amount of lift developed on the surfboard by the relative wind at 50 miles per hour is sufficient to dangerously influence the handling characteristics of the motor cycle.

The configuration of the front and rear load support members 14 and 18 respectively, is subject to considerable variation. These support members may be separable from the front and rear mounts 12 and 14 respectively, or they may be extensions of these mounts.

Preferably the front mount 12 and front load support member 14 are separate elements which are movably mounted to one another. This movable mounting or connection permits the load to shift slightly with the flexing of the vehicle. When the front mount 12 is attached to some part of a vehicle which moves, such as the front fork of the vehicle, it is essential that some means be provided for permitting relative movement between either the front mount 12 and the front load support member 14 or between some other parts of the mount. If relative movement were not permitted, the mount would immobilize the front wheels of the vehicle so that is could not be turned. Some means may also be provided for permitting relative movement between rear mount 16 and rear load support member 18, however, this movement is not as important as is the movement between front mount 12 and front load support member 14.

The front and rear contoured supports 56 and 92 respectively may be eliminated if desired. The supports provide a cushion or mounting which is contoured to fit the load, which in the accompanying drawings is a surfboard. This provides a solid secure mounting for the load and prevents its slipping out of position. Front and rear contoured supports 56 and 92, respectively, also serve to prevent damage from occurring to the load due to the vibration and jolting transmitted through the vehicle to the load. The front and rear contoured supports may be provided in several different configurations to support different shaped loads. When this is the situation and it is desired to change from one type of a load to another, the front and rear contoured supports may be changed to accommodate the new load.

The front and rear contoured supports may be made as two separate elements or they may be combined in one element. When these supports are combined as one element they form a rack which extends from the front mount to the rear mount over the head of the rider or riders of the vehicle.

Preferably some means is provided for securing the load to the load carrying structure. This load securing means may take the form of some suitable clamp, quickrelease fastener, or provisions may be made, such as strap slots 58, 62, 94 and 98, for attaching a strap or web of material to the load carrying structure. The load is secured in place by the strap or web of material.

The mounting bar 10 serves to carry the front mount away from the handle bars or other steering mechanism so that the front mount will not interfere with control of the vehicle. This is desirable from the standpoint of convenience and safety. The mounting bar may, however, be eliminated and the front mount clamped directly to the frame of the vehicle, or a different type of mounting may be provided. For example, the mounting may be a pedestal which attaches to the center of the handle bars or from some centrally located point in the front portion of the vehicle. The legs of the front mount combine to form a V-shaped configuration which meets at the pedestal. If desired, a movable connection may be provided between the pedestal and the front mount.

What has been described are preferred embodiments in which changes and modifications may be made without departing from the spirit and scope of the following claims.

What is claimed is:

1. An overhead carrier for a vehicle having a frame and two wheels which comprises:

a front mount having two legs adapted to straddle the plane defined by the vertical and longitudinal axis of said vehicle, a cross-member joining said legs adjacent one end of said legs, said legs converging from said cross-member to a common point at the other end of said legs, a stub at said other end of said legs extending at an angle which bisects the angle between said converging legs;

means for attaching said front mount to a fixed front frame portion of said two-wheeled vehicle including a socket adapted to receive said stub, said front mount and said socket being movable relative to one another;

a front load support member supported by said front mount;

a rear mount adapted to extend vertically from said vehicle when said vehicle is in its normally upright position;

means for attaching said rear mount to a rear portion of said two-wheeled vehicle;

a rear load support member supported by said rear mount; said front and rear load support members being adapted to cooperate to support a load in substantially vertical alignment with said vehicle above the head of a rider mounted on said vehicle when said vehicle is in its normally upright position.

2. An overhead carrier for a vehicle having a frame and two wheels which comprises:

a front mount having two legs adapted to straddle the plane defined by the vertical and longitudinal axis of said vehicle and to be attached to a fixed front frame portion of said vehicle, a cross-member joining said legs adjacent one end of said legs;

a front load support member movably mounted on said cross-member;

a rear mount having two legs adapted to straddle the plane defined by the vertical and longitudinal axis of said vehicle and to be attached to a rear portion of said vehicle;

a rear load support member affixed to said rear mount;

said front and rear mounts being adapted to support said front and rear load members above the head of a rider of said vehicle in substantially vertical alignment with said vehicle when said vehicle is in the normally upright position.

3. The overhead carrier of claim 2 wherein said legs of said front mount extend parallel to one another and including means for attaching said front mount comprising two receptacles adapted to receive said legs of said front mount, said receptacles being affixed to a mounting bar, a clamping bracket affixed to said mounting bar, said bracket being adapted to secure said means for attaching said front mount to a front portion of said vehicle.

4. The overhead carrier of claim 2 wherein said legs of said front mount converge from said cross-member.

5. The overhead carrier of claim 2 wherein said legs of said rear mount are attached to said vehicle at about the rear axle of said vehicle.

References Cited

UNITED STATES PATENTS

| | | | |
|---|---|---|---|
| 601,977 | 4/1898 | McDonald | 135—7 |
| 988,349 | 4/1911 | Jolley | 135—7 |
| 1,357,239 | 11/1920 | Krok. | |

FOREIGN PATENTS

| | | |
|---|---|---|
| 709,781 | 5/1931 | France. |

GERALD M. FORLENZA, *Primary Examiner.*

F. E. WERNER, *Assistant Examiner.*